(12) United States Patent
Liau

(10) Patent No.: US 6,400,058 B1
(45) Date of Patent: Jun. 4, 2002

(54) UNIVERSAL MOTOR WITH REDUCED EMI CHARACTERISTICS

(75) Inventor: Bun-Liou Liau, Taipei (TW)

(73) Assignee: Primax Electronics Ltd., Taipei (TW)

( * ) Notice: Subject to any disclaimer, the term of this patent is extended or adjusted under 35 U.S.C. 154(b) by 10 days.

(21) Appl. No.: 09/630,530

(22) Filed: Aug. 1, 2000

(51) Int. Cl.$^7$ ............................................... H02K 13/00
(52) U.S. Cl. ..................................... 310/239; 310/68 R
(58) Field of Search .................................. 310/233, 239, 310/68 R, 68 B, 242, 89, 91, 72; 318/138, 254, 439, 724

(56) References Cited

U.S. PATENT DOCUMENTS

| | | | | |
|---|---|---|---|---|
| 5,196,747 A | * | 3/1993 | Kress et al. ................... | 310/89 |
| 5,196,750 A | * | 3/1993 | Strobl ......................... | 310/239 |
| 5,208,499 A | * | 5/1993 | Barber et al. ................. | 310/51 |
| 5,610,467 A | * | 3/1997 | Shiah et al. .................. | 310/239 |

FOREIGN PATENT DOCUMENTS

| | | | | |
|---|---|---|---|---|
| JP | | 407107709 A | * 4/1995 | ................. 310/239 |

* cited by examiner

*Primary Examiner*—Tran Nguyen
(74) *Attorney, Agent, or Firm*—Winston Hsu

(57) ABSTRACT

A universal motor has a stator, a rotor, brushes, and a filter circuit on a printed circuit board (PCB). The rotor has a shaft, a commutator mounted on the shaft, and a rotor core mounted on the shaft adjacent to the commutator. The rotor core is electrically connected to the commutator, and rotates within the stator. The brushes deliver electrical power to the commutator, and they elastically contact the commutator. The filter circuit reduces the emission of electromagnetic radiation from the universal motor, and is electrically connected to the brushes. The PCB is mounted over the brushes. When electrical arcing occurs between the commutator and the brushes, the PCB acts as a shield to absorb a portion of the radiation emitted by the arcing so as to reduce the EMI characteristics of the universal motor.

6 Claims, 5 Drawing Sheets

UNIVERSAL MOTOR WITH REDUCED EMI CHARACTERISTICS

BACKGROUND OF THE INVENTION

1. Field of the Invention

The present invention relates to a universal motor. More specifically, the present invention discloses a universal motor that has reduced electromagnetic interference characteristics.

2. Description of the Prior Art

Universal motors are electric motors that, because of their ability to accept both AC and DC power sources, can be found quite readily in the market place, such as in cordless powered screwdrivers, blenders, etc. Universal motors are also in wide use in industry, as they have a simple, reliable design.

Please refer to FIG. 1. FIG. 1 is an exploded view diagram of a prior art universal motor 10. The universal motor 10 comprises a stator 20, a rotor 30 and end brackets 50 and 70. The rotor 30 has a shaft 32 onto which are mounted a commutator 34 and a rotor core 36. The rotor core 36 is wound with copper wire (not shown) to form many individual groups of windings. Each of these windings is electrically connected to a corresponding surface 35 on the commutator 34. The ends of the shaft 32 are rotatably fixed in bushings 52 and 72 of the end brackets 50 and 70, respectively. The end brackets 50 and 70 are firmly mounted onto the stator 20. Hence, the rotor core 36 rotates within the stator 20, and the commutator 34 rotates with the rotor core 36. The stator 20 also has many windings 22, which have leads 24 for delivering electrical power to the windings 22. The end bracket 50 comprises brush holders 60 for elastically holding brushes 62 in contact with the commutator 34. Electrical power is delivered by the brushes 62 to the commutator 34, and hence to the appropriate windings on the rotor core 36. Each brush holder 60 comprises a socket 61 into which a brush 62 is slidably disposed, a spring 64 for elastically pushing the brush 62 towards the commutator 34, and an external contact 66. The external contact 66 is electrically connected to the brush 62, and is used to deliver electrical power to the brush 62. Wires 68 lead off from the external contacts 66 to a power source (not shown).

As the universal motor 10 operates, the rotor 30 spins and the brushes 62 continuously make and break electrical contact with the surfaces 35 on the commutator 34. This constant making and breaking of contact leads to electrical arcing between the brushes 62 and the commutator 34. Such electrical arcing is a source of electromagnetic interference (EMI). To reduce the intensity of the EMI, the lead wires 68 first connect to a filter circuit (not shown), and the filter circuit is connected to the power source. Although the filter circuit does help to reduce some of the EMI, it cannot prevent all of the arcing. Furthermore, the long lead wires 68 to the filter circuit become a source of EMI, as they radiate like antennas.

SUMMARY OF THE INVENTION

It is therefore a primary objective of this invention to provide a universal motor that has a filter circuit on a printed circuit board, with the printed circuit board mounted over the commutator to serve as a shield against EMI caused by arcing between the commutator and the brushes.

The present invention, briefly summarized, discloses a universal motor with reduced electromagnetic interference (EMI) characteristics. The universal motor has a stator, a rotor, brushes, and a filter circuit on a printed circuit board (PCB). The rotor has a shaft, a commutator mounted on the shaft, and a rotor core mounted on the shaft adjacent to the commutator. The rotor core is electrically connected to the commutator, and rotates within the stator. The brushes deliver electrical power to the commutator, and they elastically contact the commutator. The filter circuit reduces the emission of electromagnetic radiation from the universal motor, and is electrically connected to the brushes. The PCB is mounted over the brushes. When electrical arcing occurs between the commutator and the brushes, the PCB acts as a shield to absorb a portion of the radiation emitted by the arcing so as to reduce the EMI characteristics of the universal motor.

It is an advantage of the present invention that the reduced EMI characteristics make the universal motor more convenient to use in environments where EMI effects are not well tolerated. Additionally, because the PCB is mounted directly over the commutator, no lengthy connecting wires are needed to connect the brushes to the filter circuit, and this further reduces the EMI characteristics of the present invention.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
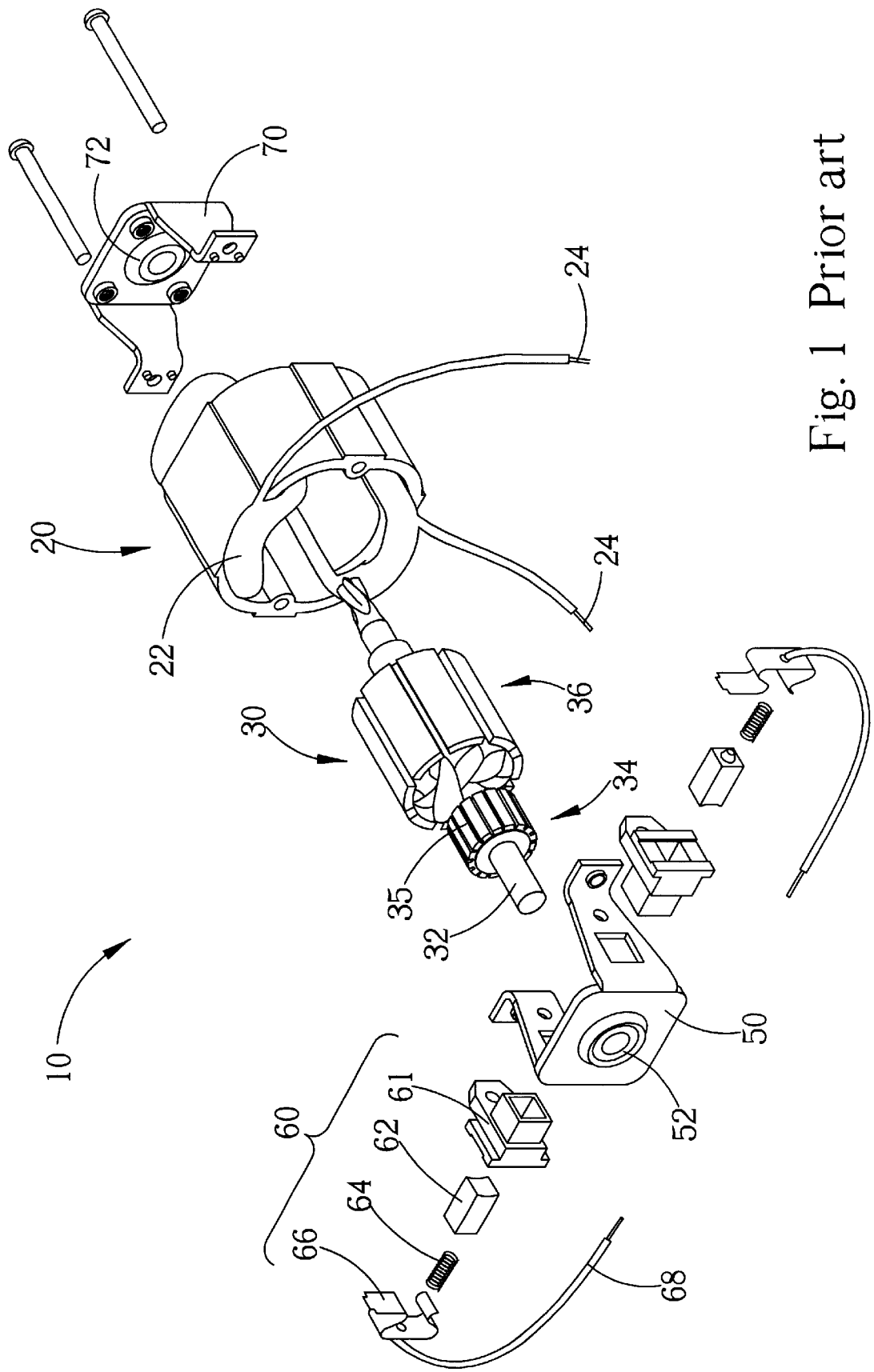
FIG. 1 is an exploded view diagram of a prior art universal motor.
Figure 2:
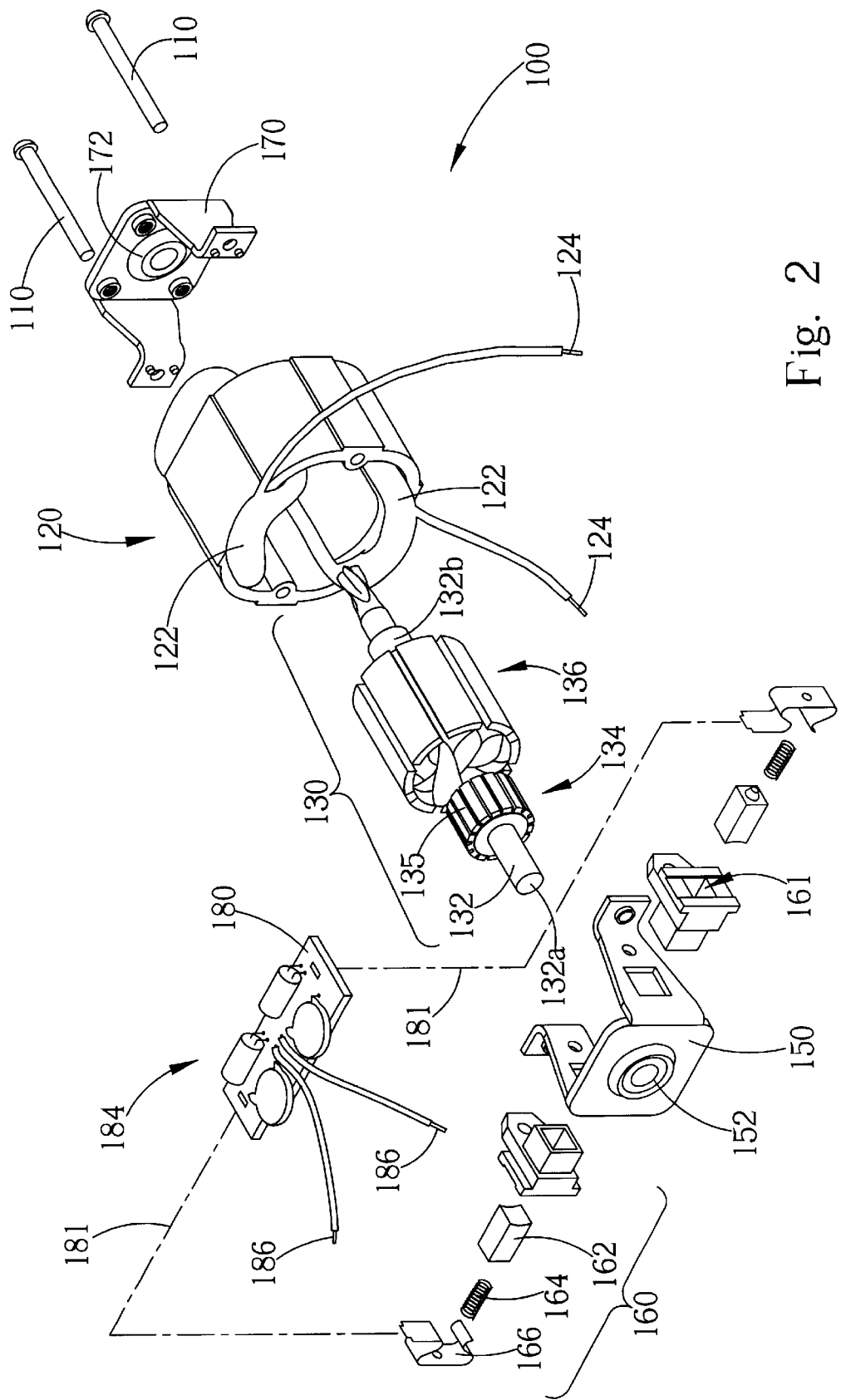
FIG. 2 is an exploded view diagram of a present invention universal motor.

Please refer to FIG. 2. FIG. 2 is an exploded view diagram of a present invention universal motor 100. The universal motor 100 comprises a stator 120, a rotor 130, end brackets 150 and 170, and a printed circuit board (PCB) 180. The rotor 130 has a shaft 132 onto which are mounted a commutator 134 and a rotor core 136 adjacent to the commutator 134. The rotor core 136 is wound with copper wire (not shown) to form many groups of windings. Each of these windings is electrically connected to a corresponding electrically conductive surface 135 on the commutator 134. The ends of the shaft 132a and 132b are rotatably fixed in bushings 152 and 172 of the end brackets 150 and 170, respectively. The end brackets 150 and 170 are firmly mounted onto the stator 120 by way of bolts 110. Hence, the rotor core 136 rotates within the stator 120, and the commutator 134 rotates inside the end bracket 150 with the rotor core 136. The stator 120 also has many windings 122, which have leads 124 for delivering electrical power to the windings 122. The end bracket 150 comprises brush holders 160 for elastically holding brushes 162 in contact with the commutator 134. Electrical power is delivered by the brushes 162 to the commutator 134, and hence to the appropriate windings on the rotor core 136. Each brush holder 160 comprises a socket 161 into which a brush 162 is slidably disposed, a spring 164 for elastically pushing the brush 162 towards the commutator 134, and an external contact 166. The external contacts 166 are electrically connected to their respective brushes 162, and are used to deliver electrical power to the brushes 162. The PCB 180 fits atop the end bracket 150 over the brushes 162 and commutator 134, and is soldered to the external contacts 166, as indicated by the dotted lines 181. The PCB has a filter circuit 184, whose purpose is to help reduce the EMI characteristics of the universal motor 100, and which is electrically connected to the brushes 162. Coming off of the filter circuit 184 are electrical leads, which are connected to a power supply (not shown) to deliver power to the universal motor 100.

Figure 3:
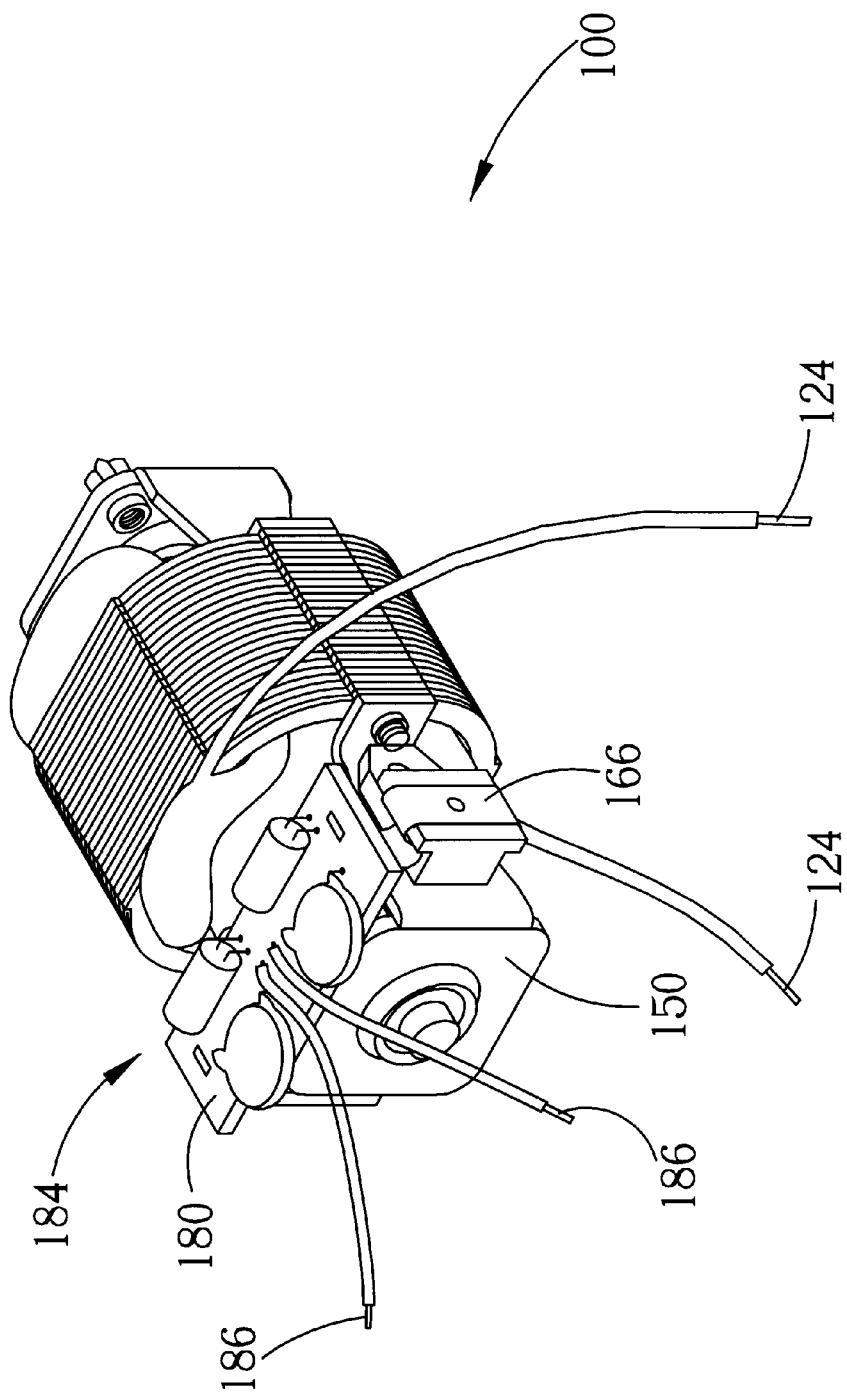
FIG. 3 is a perspective view of the present invention universal motor shown in FIG. 2.

Please refer to FIG. 3, in reference with FIG. 2. FIG. 3 is a perspective view of the universal motor 100. The PCB 180 covers an upper portion of the end bracket 150, which would otherwise be open. Hence, when electrical arcing occurs between the brushes 162 and the commutator 134, the PCB 180 acts as a shield to block and to absorb some of the electromagnetic (EM) radiation that results from this arcing. Consequently, the PCB 180 helps to reduce the EMI characteristics of the universal motor 100. The end bracket 150 also absorbs some of the EM radiation. Moreover, because the PCB is soldered to the external contacts 166, the shortness of such an electrical contact between the filter circuit 184 and the brushes 162 prevents the excessive broadcasting of EM radiation between the filter circuit 184 and the brushes 162. In this manner, the EMI characteristics of the universal motor 100 are further reduced.

Figure 4:
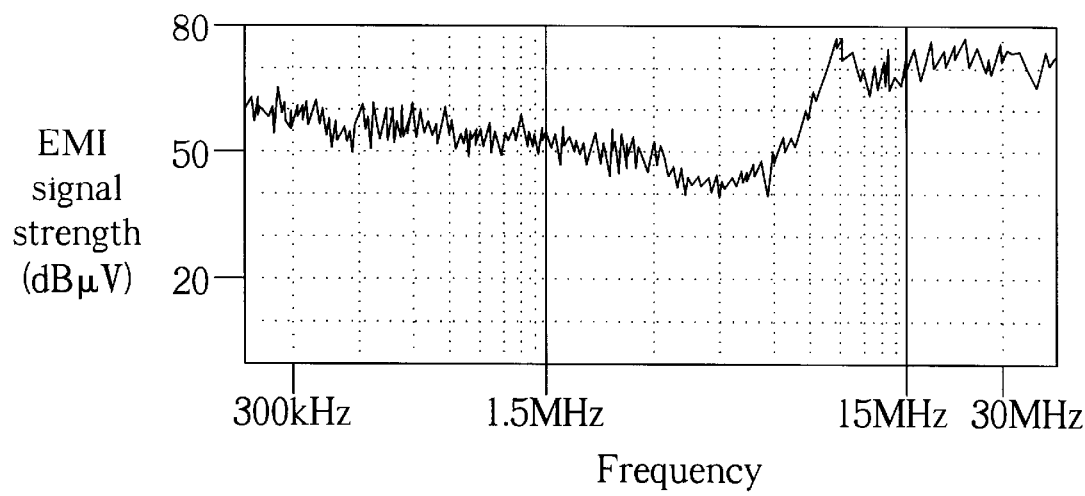
FIG. 4 is a graph of commutator EMI radiation versus motor RPM for a prior art universal motor.
Figure 5:
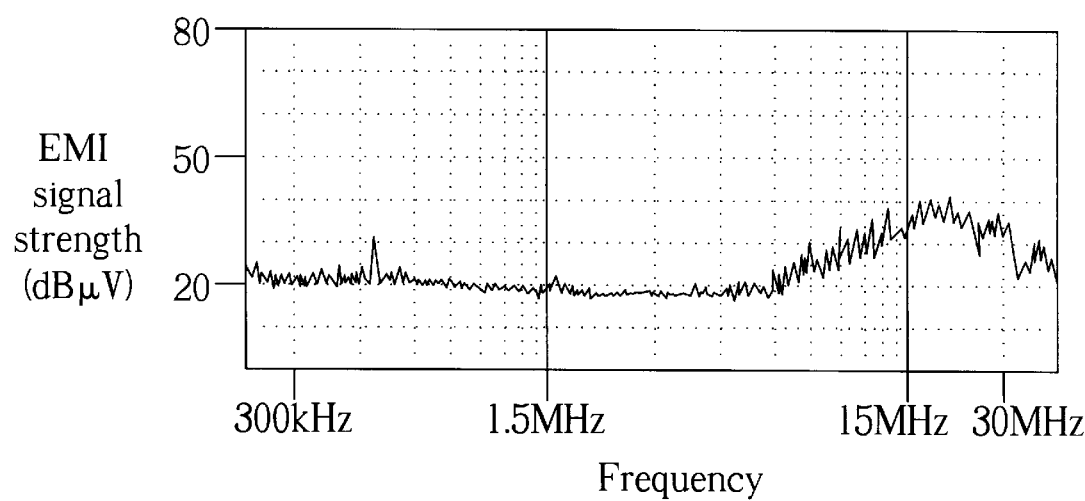
FIG. 5 is a graph of commutator EMI radiation versus motor RPM for a present invention universal motor.
Figure 6:
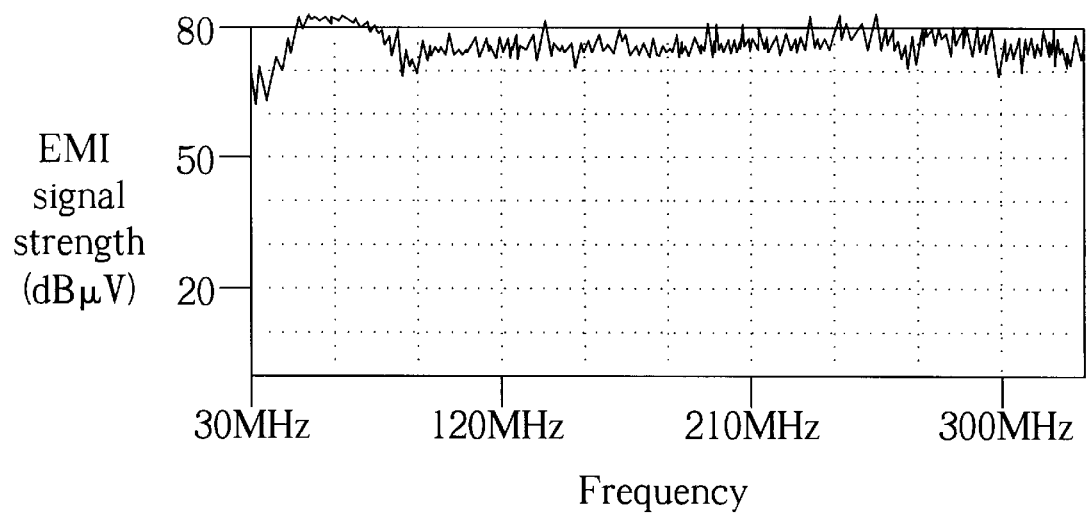
FIG. 6 is a graph of motor power cord EMI radiation versus motor RPM for the prior art motor of FIG. 4.
Figure 7:
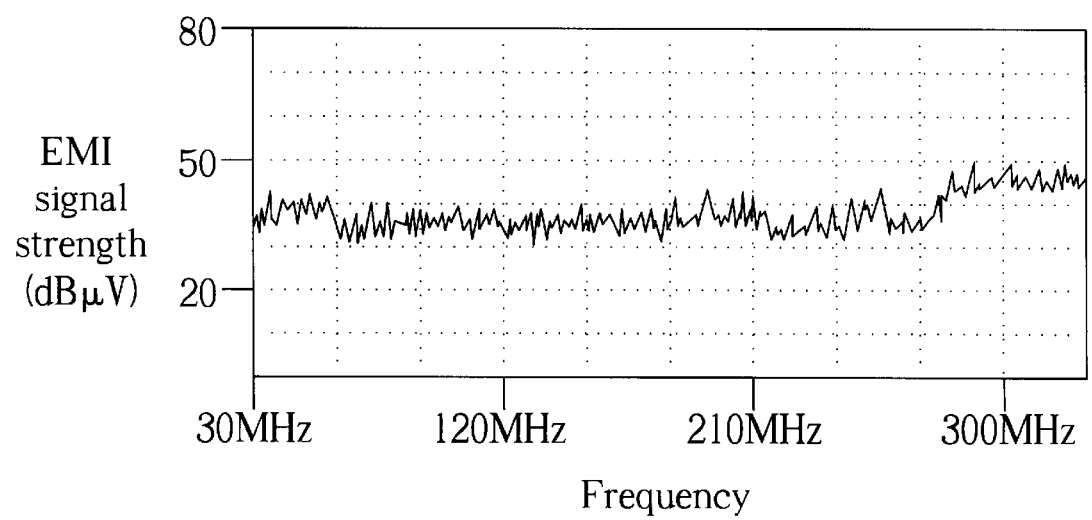
FIG. 7 is a graph of motor power cord EMI radiation versus motor RPM for the present invention motor of FIG. 5.

Please refer to FIG. 4 and FIG. 5. FIG. 4 is a graph of commutator EMI radiation versus motor RPM for a prior art universal motor. FIG. 5 is a graph of commutator EMI radiation versus motor RPM for an equivalent universal motor that utilizes the method of the present invention. Consequently, the motor from which EMI data was gathered for FIG. 5 is identical to that of FIG. 4 in most respects except that the filter circuitry is mounted on a PCB that is itself mounted over the commutator to serve as an EMI shield. Both motors are for use in a paper shredder. As is clear from FIG. 4 and 5, EMI from the present invention motor is significantly lower than that of the prior art at all motor speeds. By shielding the commutator and brushes with the PCB, a significant reduction in brush-commutator related EMI is obtained. Please refer to FIG. 6 and FIG. 7. FIG. 6 is a graph of motor power cord EMI radiation versus motor RPM for the prior art motor of FIG. 4. FIG. 7 is a graph of motor power cord EMI radiation versus motor RPM for the present invention motor of FIG. 5. The graphs clearly show that EMI resulting from motor power cables is significantly lower in the present invention motor. By eliminating the lengthy cables that connect the filter circuit to the brushes, the overall EMI from the power cables is reduced.

In contrast to the prior art, the present invention has the filter circuit on a PCB mounted over the commutator and brushes of the universal motor. The PCB acts as a shield, absorbing a portion of the electromagnetic radiation emitted when arcing occurs between the brushes and the commutator. Additionally, because the filter circuit is directly mounted on the present invention universal motor, no lengthy wires are needed to connect the brushes to the filter circuit. The absence of these wires, which are a source of EMI in the prior art, further reduces the EMI characteristics of the present invention.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A universal motor with reduced electromagnetic interference (EMI) characteristics, the universal motor comprising
   a stator;
   rotor comprising a shaft, a commutator mounted on the shaft, and a rotor core mounted on the shaft adjacent to the commutator, the rotor core electrically connected to the commutator, the rotor core rotatably mounted within the stator;
   brushes for delivering electrical power to the commutator, the brushes elastically contacting the commutator; and
   a printed circuit board (PCB) comprising a filter circuit for reducing the emission of electromagnetic radiation from the universal motor, the filter circuit electrically connected to the brushes, the PCB mounted over the brushes and over the commutator, substantially covering the brushes and the commutator;
   wherein when electrical arcing occurs between the commutator and the brushes, the PCB acts as a shield to absorb a portion of the radiation emitted by the arcing so as to reduce the EMI characteristics of the universal motor.

2. The universal motor of claim 1 further comprising an end bracket fixed to the stator, an end of the rotor rotatably mounted on the end bracket, the brushes mounted on the end bracket, and the commutator rotating within the end bracket;
   wherein the PCB is mounted on the end bracket above the commutator.

3. The universal motor of claim 2 wherein the end bracket further comprises brush holders for holding the brushes in elastic contact with the commutator, each brush holder comprising:
   a socket for holding a brush;
   a spring disposed in the socket for elastically pushing the brush onto the commutator; and
   an external contact electrically connected to the brush;
   wherein the PCB is soldered to the external contacts of the brush holders.

4. A method for reducing electromagnetic interference (EMI) characteristics of a universal motor, the universal motor comprising:
   a stator;
   a rotor comprising a shaft, a commutator mounted on the shaft, and a rotor core mounted on the shaft adjacent to the commutator, the rotor core electrically connected to the commutator, the rotor core rotatably mounted within the stator;
   brushes for delivering electrical power to the commutator, the brushes elastically contacting the commutator; and
   a printed circuit board (PCB) comprising a filter circuit for reducing the emission of electromagnetic radiation from the universal motor, the filter circuit electrically connected to the brushes;
   the method comprising:
   mounting the PCB over the brushes and over the commutator to substantially cover the commutator and the brushes so that when electrical arcing occurs between the commutator and the brushes, the PCB acts as a shield to absorb a portion of the radiation emitted by the arcing so as to reduce the EMI characteristics of the universal motor.

5. A method of claim 4 wherein the universal motor further comprises an end bracket fixed to the stator, an end of the rotor rotatably mounted on the end bracket, the brushes mounted on the ned bracket, and the commutator rotating within the end bracket; wherein the PCB id mounted on the end bracket above the commutator.

6. A method of claim 5 wherein the end bracket further comprises brush holders for holding the brushes in elastic contact with the commutator, each brush holder comprising:
 a socket for holding a brush;
 a spring disposed in the socket for elastically pushing the brush onto the commutator; and
 an external contact electrically connected to the brush;
 wherein the PCB is soldered to the external contacts of the brush holders.

\* \* \* \* \*